(12) United States Patent
Lepreux et al.

(10) Patent No.: US 8,418,442 B2
(45) Date of Patent: Apr. 16, 2013

(54) METHOD AND SYSTEM FOR CONTROLLING ACTIVE REGENERATION OF A DIESEL PARTICULATE FILTER

(75) Inventors: Olivier Lepreux, Meyzieu (FR); Yann Creff, Les côtes d'Arey (FR); Nicolas Petit, Sceaux (FR)

(73) Assignee: IFP, Cedex (FR)

( * ) Notice: Subject to any disclaimer, the term of this patent is extended or adjusted under 35 U.S.C. 154(b) by 274 days.

(21) Appl. No.: 12/832,597

(22) Filed: Jul. 8, 2010

(65) Prior Publication Data

US 2011/0011062 A1 Jan. 20, 2011

(30) Foreign Application Priority Data

Jul. 15, 2009 (FR) ..................................... 09 03475

(51) Int. Cl.
*F01N 3/00* (2006.01)
*F02B 27/04* (2006.01)
(52) U.S. Cl.
USPC ..................... 60/286; 60/273; 60/295; 60/297
(58) Field of Classification Search ............. 60/273–324
See application file for complete search history.

(56) References Cited

U.S. PATENT DOCUMENTS

| | | | |
|---|---|---|---|
| 7,047,729 B2 | 5/2006 | Van Nieuwstadt et al. | |
| 7,877,986 B2* | 2/2011 | Sloane ............................. | 60/295 |
| 8,230,677 B2* | 7/2012 | Devarakonda et al. ......... | 60/286 |
| 8,245,501 B2* | 8/2012 | He et al. .......................... | 60/286 |
| 2005/0086929 A1 | 4/2005 | Nieuwstadt et al. | |
| 2007/0000238 A1 | 1/2007 | Marlett et al. | |
| 2008/0155965 A1 | 7/2008 | Henderson et al. | |
| 2008/0271434 A1* | 11/2008 | Sloane ............................. | 60/274 |
| 2010/0050607 A1* | 3/2010 | He et al. .......................... | 60/286 |
| 2010/0050609 A1* | 3/2010 | Parmentier et al. ............. | 60/286 |
| 2010/0300070 A1* | 12/2010 | He et al. .......................... | 60/274 |

FOREIGN PATENT DOCUMENTS

| | | |
|---|---|---|
| EP | 1 832 728 A1 | 9/2007 |
| FR | 2 921 416 A1 | 3/2009 |

OTHER PUBLICATIONS

Search Report.

* cited by examiner

*Primary Examiner* — Thomas Denion
*Assistant Examiner* — Anthony Ayala Delgado
(74) *Attorney, Agent, or Firm* — Antonelli, Terry, Stout & Kraus, LLP.

(57) ABSTRACT

Method of controlling the active regeneration of a particulate filter through dynamic control of the temperature at the outlet of an oxidation catalyst.
A control law is defined for a hydrocarbon flow rate at the oxidation catalyst inlet, by means of the ratio between a temperature demand and a gain. The gain can be corrected so as to take account of the transient phenomena that occur in the oxidation catalyst during a gas flow rate variation. The temperature demand can comprise a precompensation term to compensate for the effects of a temperature variation at the oxidation catalyst inlet. The temperature demand can comprise a feedback term calculated by a controller whose parameters are automatically calculated by means of a physical model of the catalyst, during operating conditions variations. Any combination of these terms allows to define a suitable control law. Finally, the hydrocarbon flow rate is modified by applying the control law so that the temperature of the gas leaving said catalyst respects a set point temperature.
Application: engine control.

15 Claims, 6 Drawing Sheets

METHOD AND SYSTEM FOR CONTROLLING ACTIVE REGENERATION OF A DIESEL PARTICULATE FILTER

FIELD OF THE INVENTION

The main field of application of the invention is the treatment of diesel engine exhaust gas. In particular, the method relates to temperature control downstream from an oxidation catalyst. In particular, control of this temperature provides active regeneration of a particulate filter.

BACKGROUND OF THE INVENTION

As it is known from the prior art, diesel engines subjected to emission standards are or are going to be equipped with particulate filters so as to meet these standards. The soots accumulate on the walls of the particulate filter. In order to provide proper gas circulation in the exhaust system and therefore smooth operation of the engine, these soots have to be regularly burned during an <<active regeneration>> period. This active regeneration is achieved by raising the temperature of the particulate filter. In most configurations, this temperature rise is carried out by means of oxidation of hydrocarbons injected into the exhaust system: an oxidation catalyst is placed upstream from a particulate filter; the hydrocarbons can notably be supplied by the main injection system of the engine or by a specific injector arranged between the exhaust manifold and the oxidation catalyst inlet.

In the diesel engine post-treatment system comprising a particulate filter, it is very important to properly control the temperature of the gas flowing into the particulate filter at the risk of damaging this filter. It is therefore very important to control the temperature of the gas leaving the oxidation catalyst.

The technical problem is as follows. The goal is to maintain, during active regeneration periods, the temperature of the oxidation catalyst close to a set point temperature under all the conditions of use of the vehicle. When using the vehicle, the external conditions imposed on the oxidation catalyst are rapidly and highly variable. It is therefore difficult to solve the aforementioned problem.

There are methods that are currently used to solve this problem.

The most commonly used method consists in calibrating a conventional controller (PI, PID, Smith predictor, internal model, etc.), This calibration is carried out for a large combination of stationary operating conditions. When using the control, the operating conditions are detected and the corresponding parameters of the regulator are applied.

A precompensation term is commonly added to this method. This term is evaluated notably as a function of the difference between the inlet temperature and the set point temperature, as described in document U.S. Pat. No. 7,047,729 B2.

However, current methods involve some performance limitations because: they do not take finely account of the phenomenologic differences between the effect of hydrocarbons on the oxidation catalyst and the effect of the temperature upstream from the oxidation catalyst; they take into account, in a limited way, the dynamic aspect of the effects linked with the gas flow rate variations; they take into account, in a limited way, the gas flow rate variations for dynamic adaptation of the controller parameters. Furthermore, current methods exhibit limitations in terms of calibration effort because they do not express the controller parameters from quantities resulting from physical modelling of the oxidation catalyst.

The object of the invention is an alternative method for treating the exhaust gas of an internal-combustion engine, wherein active regeneration of a particulate filter is controlled by means of dynamic control of the temperature at the outlet of an oxidation catalyst. The method overcomes the limitations of the prior art by means of a control law comprising:
- a term taking into account transient phenomena that occur in the oxidation catalyst during a gas flow rate variation,
- or a precompensation term taking into account the dynamic differences between the effect of the temperature disturbance at the oxidation catalyst inlet and the effect of the control of hydrocarbon injection upstream from the oxidation catalyst,
- or a feedback term based on physical modelling of the oxidation catalyst allowing the controller parameters to be expressed as a function of the parameters of the physical model and taking dynamically into account the adaptation of the controller parameters during operating conditions variations,
- or any combination of these three terms.

The invention also relates to an internal-combustion engine comprising a control system suited for implementing the methods according to the invention.

SUMMARY OF THE INVENTION

One object of the invention is a method of treating the exhaust gas of an internal-combustion engine equipped with a particulate filter and an oxidation catalyst arranged upstream from the filter, wherein active regeneration of the filter is controlled by means of a dynamic control of a temperature T2 of the gas leaving the oxidation catalyst. The method comprises the following stages:

i—determining a set point temperature Tc of said gas leaving said catalyst so as to provide active regeneration of said filter, ii—determining a temperature demand necessary for control of said temperature T2, iii—determining a stationary gain G defined as the ratio between the stationary value of a variation of T2 and a stationary value of a hydrocarbon mass flow rate variation that has induced said variation of T2, iv—correcting said gain G so as to take into account a gas flow rate variation at the inlet of said catalyst, the gain being transiently increased in relation to G for a gas flow rate increase and transiently decreased in relation to G for a gas flow rate decrease, v—defining a control law for a hydrocarbon flow rate at the inlet of said oxidation catalyst, through the ratio of said temperature demand and said corrected gain, vi—modifying the hydrocarbon flow rate by applying the control law so that the temperature of said gas leaving said catalyst meets said set point temperature.

According to this method, gain G can be corrected by calculating a derivative of the gas flow passing through the catalyst, or by applying a delay to the gain according to the formula as follows:

$$\text{Ginst}(t) = G(t - D(t))$$

with Ginst the corrected gain, D the delay determined as a function of gas flow rate Q and of its variations, t the time.

One object of the invention relates to a second method of treating the exhaust gas of an internal-combustion engine equipped with a particulate filter and an oxidation catalyst arranged upstream from the filter, wherein active regeneration of the filter is controlled by means of a dynamic control of a temperature T2 of the gas leaving the oxidation catalyst. The method comprises the following stages:

i—determining a temperature demand TFF necessary to compensate for an effect of a variation of temperature T1 of said gas at the inlet of said catalyst, TFF being a function of a difference between T1(t−δ(t)) and a reference value Tbar, where $T1(t-\delta(t))$ is an expression of a measurement of $T1(t)$ delayed by a delay of value $\delta(t)$;

ii—determining a stationary gain G defined as the ratio between the stationary value of a variation of T2 and a stationary value of a hydrocarbon mass flow rate variation that has induced said variation of T2, all the other parameters remaining constant;

iii—defining a control law uFF of a hydrocarbon flow rate at the inlet of said oxidation catalyst, through the ratio between said temperature demand TFF and said gain, iv—modifying the hydrocarbon flow rate by applying the control law so that the temperature of said gas leaving said catalyst meets said temperature demand TFF.

According to this second method, delay $\delta$ can be defined as a function of a delay $\delta2$ obtained by solving the implicit equation as follows:

$$L - Lu = \int_{t-\delta2(t)}^{t} v(w)dw$$

with:
L: a length of the oxidation catalyst,
Lu: an oxidation catalyst length allowing to best bring together, on the one hand, a normalized indicial response to a variation of T1 on a catalyst of length Lu and, on the other hand, a normalized indicial response to a hydrocarbon flow rate variation on an oxidation catalyst of length L,
v. a mean velocity of the gas in said oxidation catalyst.

According to this second method, gain G can be corrected so as to take into account a gas flow rate variation at the inlet of said catalyst, the gain being transiently increased in relation to G for a gas flow rate increase and transiently decreased in relation to G for a gas flow rate decrease.

One object of the invention relates to a third method of treating the exhaust gas of an internal-combustion engine equipped with a particulate filter and an oxidation catalyst arranged upstream from the filter, wherein active regeneration of the filter is controlled by means of a dynamic control of a temperature T2 of the gas leaving the oxidation catalyst. The method comprises the following stages:

i—determining a set point temperature Tc of said gas leaving said catalyst so as to provide active regeneration of said filter, ii—determining a temperature demand TFB necessary for temperature T2 of said gas leaving said catalyst to meet said set point temperature Tc, said demand TFB being calculated from a controller whose parameters are determined by means of a physical model of the oxidation catalyst, based on an energy balance of a gas phase and an energy balance of a solid phase, as a function of the engine operating conditions, iii—determining a stationary gain G defined as the ratio between the stationary value of a variation of T2 and a stationary value of a hydrocarbon mass flow rate variation that has induced said variation of T2, iv—defining a control law uFB for a hydrocarbon flow rate at the inlet of said oxidation catalyst, through the ratio of said temperature demand TFF and said gain, v—modifying the hydrocarbon flow rate by applying the control law so that the temperature of said gas leaving said catalyst meets said set point temperature.

According to this third method, gain G can be corrected so as to take into account a gas flow rate variation at the inlet of said catalyst, the gain being transiently increased in relation to G for a gas flow rate increase and transiently decreased in relation to G for a gas flow rate decrease.

According to the invention, the control law applied to modify the hydrocarbon flow rate can be defined by the sum of control laws uFF and uFB. These control laws can be defined from a corrected gain so as to take into account a gas flow rate variation at the inlet of said catalyst, the gain being transiently increased in relation to G for a gas flow rate increase and transiently decreased in relation to G for a gas flow rate decrease.

Finally, another object of the invention relates to an internal-combustion engine comprising an exhaust gas treatment system, an oxidation catalyst (15) arranged upstream from a particulate filter (16) and an injection system (80) acting in the engine. The engine comprises a control system (50) for controlling the injection system so as to provide a hydrocarbon flow rate upstream from the oxidation catalyst, in accordance with one of the methods described above.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

The following notations are introduced to describe the invention;

T1: temperature representative of the gas temperature upstream from the oxidation catalyst (DOC), T2: temperature representative of the gas temperature downstream from the oxidation catalyst (upstream from the particulate filter (DPF)), u: hydrocarbon flow rate upstream from the oxidation catalyst. It takes account of all the hydrocarbons present, L: length of the oxidation catalyst, Lu: oxidation catalyst length allowing to best bring together, on the one hand, a normalized indicial response to a variation of T1 on a catalyst of length Lu and, on the other hand, a normalized indicial response to a hydrocarbon flow rate variation on an oxidation catalyst of length L. It can be noted that the notion of different length between L and Lu is equivalent to the notion of different response time between the response to a variation of T1 and the response to a hydrocarbon flow rate variation. One considers that Lu<L, which amounts to saying that the response to a variation of T1 is slower than the response to hydrocarbon flow rate u. This also amounts to saying that the dynamics of the response to a hydrocarbon flow rate on a catalyst of length L can be identified with the dynamics of the response to a variation of temperature T1 on a catalyst of length Lu, k1, k2; characteristic values of the oxidation catalyst, Q: gas mass flow rate in the oxidation catalyst. It can be measured or estimated, G: stationary gain, defined as the ratio between the stationary value of a variation of T2 and the stationary value of the hydrocarbon mass flow rate variation u that has induced this variation of T2, all the other parameters remaining constant, notably T1 and Q, v mean velocity of the gas in the channels of the oxidation catalyst, Kd: gain defined as the ratio between the stationary value of a variation of T2 and the stationary value of the variation of T1 that has induced this variation of T2, r efficiency, defined as the ratio between the flow of hydrocarbons consumed in the oxidation catalyst and the total hydrocarbon flow rate u upstream from the oxidation catalyst.

What is referred to as effect of a variation of T1 (or response to a variation of T1) is the effect of this variation on temperature T2. What is referred to as effect of a variation of hydrocarbon flow rate u (or response to a variation of hydrocarbon flow rate u) is the effect of this variation on temperature T2.

Figure 1:
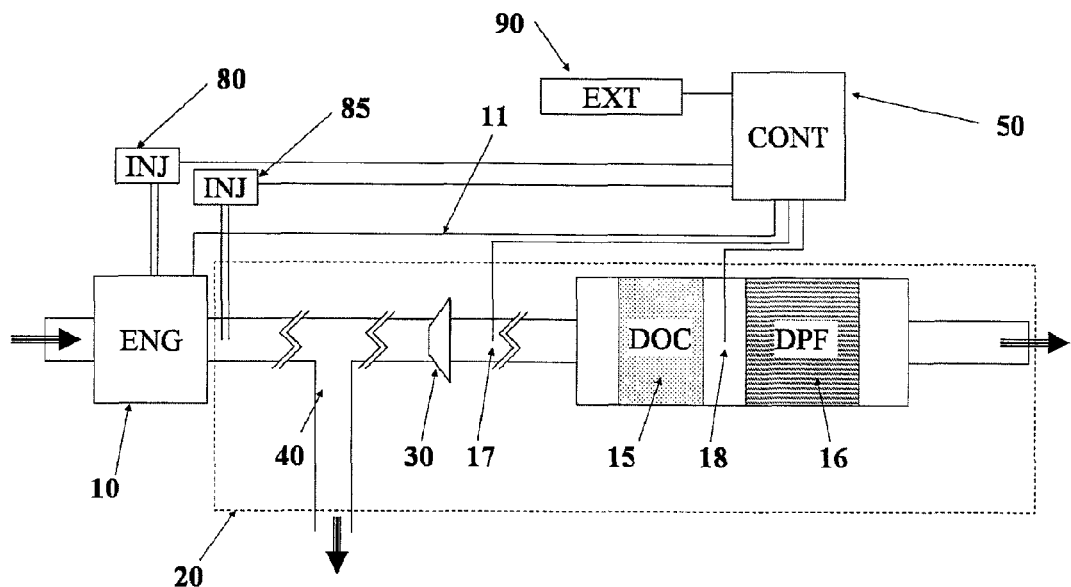
FIG. 1 describes an internal-combustion engine according to the invention, comprising an exhaust gas treatment system, FIG. 2 diagrammatically shows the system to be controlled and variables used.
Figure 2:
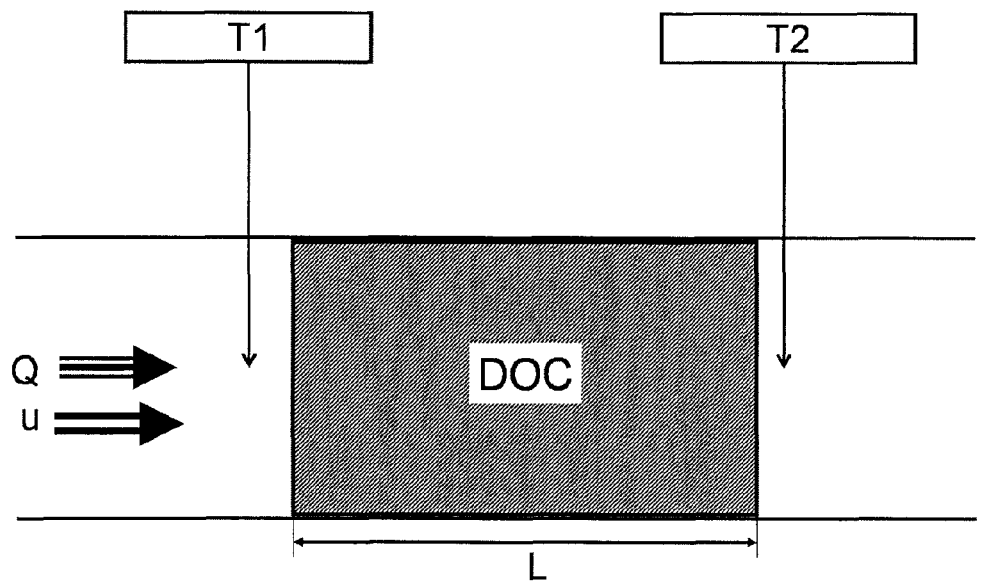

FIG. 2 diagrammatically shows the system to be controlled and variables used. The method aims to make temperature T2 tend towards a set point temperature Tc. The method modifies the value of hydrocarbon flow rate u upstream from the oxidation catalyst.

The object of the invention is an alternative method of treating exhaust gas of an internal-combustion engine, wherein active regeneration of a particulate filter is controlled by means of a dynamic control of the temperature at the outlet of an oxidation catalyst. According to the invention, three options allow this technical problem to be solved. All the combinations between these options are also objects of the invention.

According to a first option, the temperature variation demands are converted to a control u, by taking into account transient phenomena occurring in the oxidation catalyst via calculation of an instantaneous gain.

According to a second option, control u comprises a precompensation term uFF. This term uFF is used to precompensate for the variations of temperature T1, i.e. to make minimal the effect of the variations of temperature T1 on temperature T2. It is a non-linear function of the variations of T1 in relation to a reference Tbar that is arbitrarily selected.

According to a third option, control u comprises a feedback term uFB. This term uFB is used to make temperature T2 tend towards set point temperature Tc by means of a feedback method.

Figure 3:
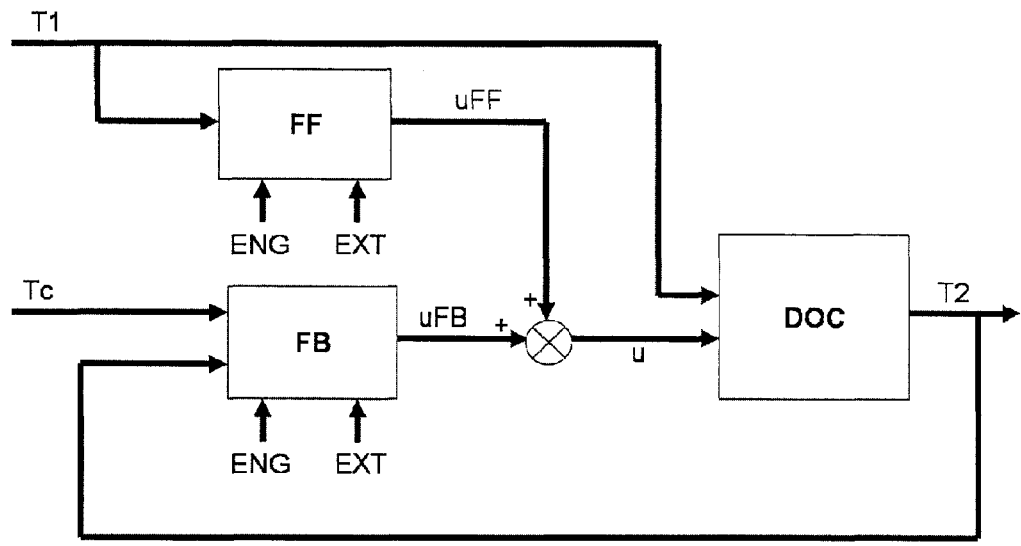
FIG. 3 is a diagrammatic representation of the controller used in the method according to the invention, FIG. 4 diagrammatically illustrates a controller with an internal model MU used alternatively in the method according to the invention, FIG. 5 diagrammatically illustrates a Smith predictor type controller representing a particular case of the controller shown in FIG. 4, FIG. 6 diagrammatically illustrates a controller with an internal model M used alternatively in the method according to the invention.

According to a fourth option, control u can be broken down into the sum of precompensation term uFF and of feedback term uFB. FIG. 3 is a diagrammatic presentation of the controller used by the method of the invention according to this option.

The last three options can be combined with the first one.

In all the options, calculation of control u can be adapted according to operating conditions ENG (air flow rate, engine speed, set torque, rail pressure, etc.) or to ambient conditions EXT (outside temperature, etc.).

Definition of Instantaneous Gain Ginst

According to a first option, in order to convert the temperature variation demands in the control unit of the actuator (mass flow rate expressed in kg/h for example), the following control law is used:

$$u = \frac{T}{G}$$

with:

T: the temperature demand, u: the hydrocarbon flow rate required to meet temperature demand T, G: stationary gain, defined as the ratio between the stationary value of a variation of T2 and the stationary value of the variation of hydrocarbon mass flow rate u that has induced this variation of T2, all the other parameters remaining constant, Gain G can be evaluated experimentally or from the reaction enthalpy of the hydrocarbons, as presented in Appendix 1 for example, A value of this gain can correspond to each stationary value of the gas flow rate.

The value conventionally calculated with the stationary gain does not take account of the transient phenomena that occur in the oxidation catalyst during gas flow rate variations, which causes great variations of temperature T2, while temperature T1 and temperature demand T are constant, Current methods have the same performance limitations because they take account, in a limited way, of the dynamic aspect of the effects linked with the gas flow rate variations.

According to a first option of the invention, in order to convert the temperature demand variations in the control unit of the actuator (mass flow rate expressed in kg/h for example), the following calculation is used:

$$u = \frac{T}{Ginst}$$

with:

T: the temperature demand, u: the hydrocarbon flow rate required to meet temperature demand T, Ginst: instantaneous gain to be applied at the current time, It is based on stationary gain G to which a correction is applied in order to overcome the effects of the variations of gas flow rate Q.

The general principle of this correction is that, in relation to the value of gain G calculated conventionally, due to increases in gas flow rate Q, instantaneous gain Ginst is transiently increased and, consequently, the hydrocarbon flow rate is transiently decreased in relation to the value calculated conventionally. In relation to the value of gain G calculated conventionally, due to reductions in gas flow rate Q, instantaneous gain G is transiently decreased and, consequently, the hydrocarbon flow rate is transiently increased in relation to the value calculated conventionally.

In order to achieve this general principle, another proposed method consists in delaying the effect of the stationary gain according to:

$$Ginst(t) = G(t - D(t))$$

Ginst: instantaneous gain to be applied at the current time,

D: stationary gain application delay. It is determined as a function of gas flow rate Q and of its variations, G: stationary gain. G(t−D(t)) represents the value of G delayed by a delay of value D(t).

Figure 11:
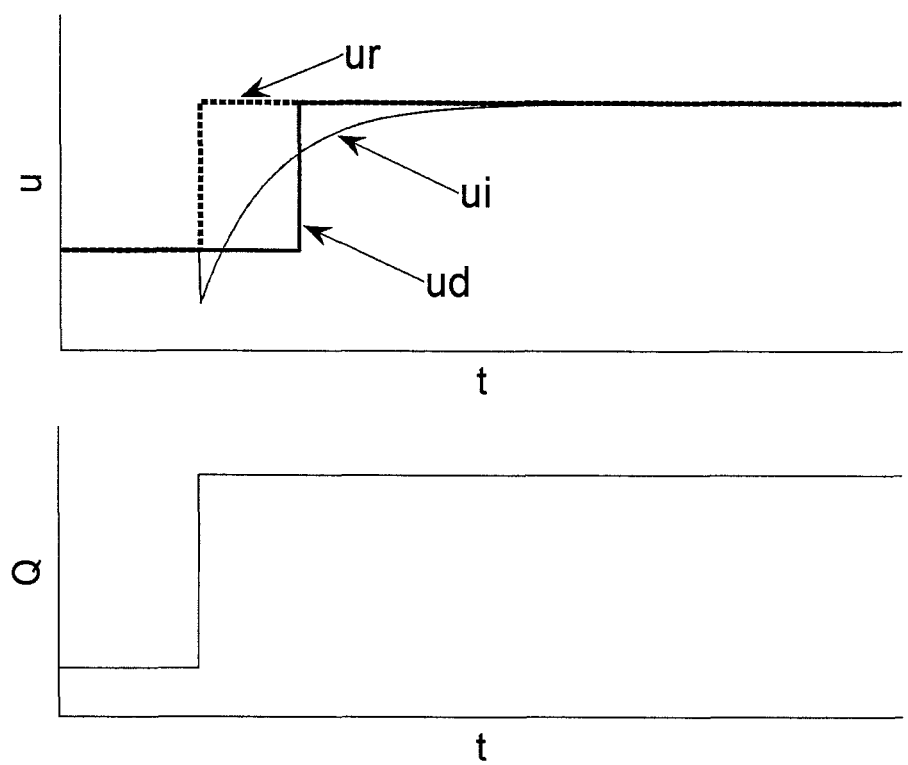
FIG. 11 illustrates the evolution of the hydrocarbon flow rate u to be applied during a gas flow rate variation.

These two general principle embodiment examples are diagrammatically shown in FIG. 11 for the case of a gas flow rate increase.

FIG. 11 illustrates the evolution of the hydrocarbon flow rate u to be applied during a gas flow rate variation for a constant temperature demand. Value ur is the hydrocarbon flow rate applied in the conventional case based on the variations of flow rate Q by means of stationary gain G. Values ui and ud are examples of the control u to be applied according to the invention, i.e. by means of instantaneous gain Ginst. In the presented case of an increase of gas flow rate Q, hydrocarbon flow rates ui or ud are lower than hydrocarbon flow rate ur during a transient period following this variation of gas flow rate Q.

Definition of Precompensation Term uFF

Precompensation term uFF is used to compensate for the effects of the variations of temperature T1. Term uFF represents a hydrocarbon (HC) flow rate required to compensate for the effects of the variations of T1. The purpose of hydrocarbon flow rate uFF is to be such that the variations of T2 generated by the variations of T1 are minimal. It is a non-linear function of the variations of T1 in relation to a reference Tbar selected arbitrarily.

The precompensation strategy consists in delaying the compensation of an effect of a variation of T1 in order to synchronize the effect of T1 with the effect generated by a variation of hydrocarbon flow rate uFF, The synchronization delay is calculated with a variable gas flow rate (Q).

Figure 7:
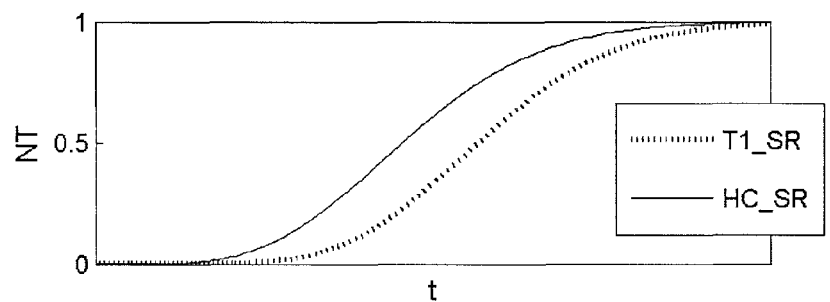
FIG. 7 illustrates the differences between the response to a variation of temperature T1 upstream from the oxidation catalyst and the response to a hydrocarbon flow rate variation.

In fact, on the basis of experimentally validated models, it is possible to establish that the responses to variations of T1 and to hydrocarbon flow rate variations are different. FIG. 7 illustrates this phenomenon. FIG. 7 illustrates differences between the responses to a variation of temperature T1 and to a hydrocarbon flow rate variation. Value T1_SR represents the indicial response to a variation of T1. Value HC_SR represents the indicial response to a hydrocarbon flow rate variation. Value NT is the normalized variation of temperature T2, Value t represents time.

The precompensation strategy of the method is based on the principle that response T1_SR is slower than response HC_SR and it consists in delaying the hydrocarbon flow rate control upon detection of a variation of T1 so as to synchronize effects T1_SR with effects HC_SR in order to compensate for effects T1_SR by effects HC_SR.

Figure 8:
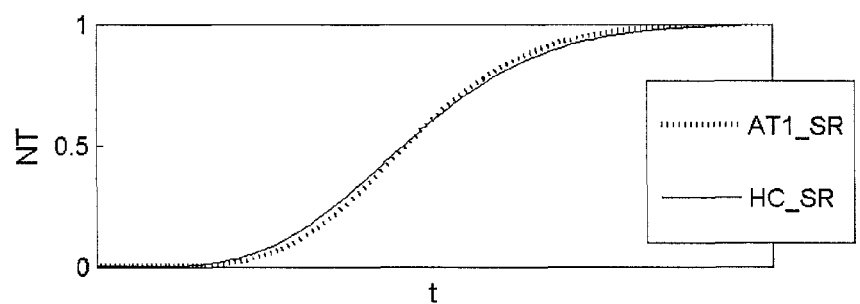
FIG. 8 shows a comparison of a response to variations of temperature T1 over a fictitious length and of a response to hydrocarbon flow rate variations.

FIG. 8 shows a comparison of a response to variations of temperature T1 over a fictitious length and of a response to hydrocarbon flow rate variations. Value AT1_SR represents the normalized indicial response to a variation of T1 for an oxidation catalyst having a suitable length Lu. Value HC_SR represents the normalized indicial response to a hydrocarbon flow rate variation for an oxidation catalyst having a length L, L being greater than or equal to Lu.

Figure 9:
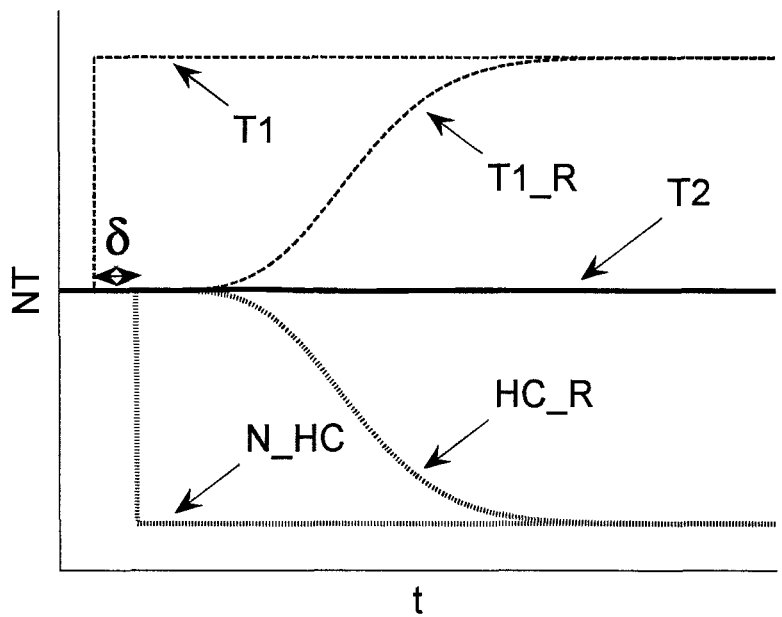
FIG. 9 illustrates the synchronization strategy according to the invention.

FIG. 9 illustrates the synchronization strategy according to the invention. Value T1_R represents the effect of the variation of T1 at the oxidation catalyst outlet. Value N_HC represents the normalized flow rate of the hydrocarbons oxidized in the oxidation catalyst. Value HC_R represents the effect of the variation of these hydrocarbons N_HC. Finally, value δ represents the delay applied to the hydrocarbon flow rate control upon a variation of temperature T1. Using this delay allows to reject effect T1_R of this variation on temperature T2.

According to the invention, in order to convert the temperature demand variations in the control unit of the actuator (mass flow rate expressed in kg/h for example), the following calculation is used:

$$uFF = \frac{TFF}{GFF} = \frac{f(T1 - Tbar)}{GFF}$$

with:

Tbar: any reference value. It can be for example equal to the value of T1 at the time when the controller is activated, TFF: temperature variation demand for compensating for the variation of T1. TFF is a function of the difference between T1 and Tbar, GFF: instantaneous gain to be applied at the current time to convert the temperature variation demand TFF to hydrocarbon flow rate uFF. In particular, one can take GFF=Ginst.

According to a preferred embodiment, TFF is calculated as a function of the difference between $T1(t-\delta(t))$ and Tbar, where $T1(t-\delta(t))$ is the expression of the measurement of $T1(t)$ delayed by a delay of value $\delta(t)$. In particular, TFF is calculated by the formula:

$$TFF = -Kd(T1(t-\delta(t)) - Tbar)$$

In particular, delay $\delta$ is calculated on the basis of a delay $\delta2$. Value $\delta2$ is obtained by solving the implicit equation as follows:

$$L - Lu = \int_{t-\delta2(t)}^{t} v(w)dw$$

Delay $\delta$ is obtained by a linear or non-linear function of $\delta2$. In particular, $\delta$ can be expressed by: $\delta = a.\delta2 + b$, where a and b are constants to be defined. One can take $\delta = \delta2$.

Besides, gain Kd is defined as the ratio between the stationary value of a variation of T2 and the stationary value of the variation of T1 that has induced this variation of T2. One preferably takes Kd=1.

The value of instantaneous gain GFF is the value of the gain to be applied at the current time. It can be taken equal to the value of stationary gain G. Alternatively, it can be taken equal to the value of stationary gain G corrected by a function of the filtered derivative of the gas flow passing through the catalyst, or to the value of delayed stationary gain G, as described for the first embodiment.

An example of a method for calculating the gain is presented in Appendix 1.

In practice, the difference between T1 and Tbar is calculated on a continuous basis. If this difference is non zero, one wants to modify hydrocarbon flow rate uFF so as to compensate for this temperature variation. The rate of the modification time of this flow rate is set by the calculation step of the engine controller. For each calculation step, delay $\delta(t)$ is calculated and one seeks which variations of T1 happened at time $t-\delta(t)$, These are the variations to be compensated for, Temperature demand TFF (and therefore flow rate uFF) is thus modified according to these variations of T1 that occurred at time $t-\delta(t)$.

Thus, when a variation of T1 is detected, it is not compensated for immediately. One "waits" for a time $\delta$ (that is not determined at the time when the variation is detected) prior to varying temperature variation demand TFF and therefore flow rate uFF. The example hereafter illustrates the principle of precompensation term uFF for a constant gas flow rate Q:

at $t = 0s$:   $T1 = 400°$ C.   $TFF = 0°$ C.   $uFF = 0$ kg/h     ($Tbar = T1 = 400°$ C.)

at $t = 1s$:   $T1 = 390°$ C.   $TFF = 0°$ C.   $uFF = 0$ kg/h  < –here we have a variation of $T1$ at $t = 2s$:   $T1 = 390°$ C.   $TFF = 0°$ C.   $uFF = 0$ kg/h

...

at $t = 21s$:   $T1 = 390°$ C.

one calculates δ: (δ=20 s. One deduces that it is time to compensate for the variation of T1 that occurred at t=1. One finds:

$TFF = 10°$ C. and, for example, $uFF = 0.6$ kg/h at $t = 22s$:   $T1 = 390°$ C.     $TFF = 10°$ C.   $uFF = 0.6$ kg/h

...

Definition of Feedback Term uFB

Feedback term uFB is used to make temperature T2 tend towards set point temperature Tc.

According to the invention, in order to convert the temperature variation demands in the control unit of the actuator (mass flow rate expressed in kg/h for example), the following calculation is used:

$$uFB = \frac{TFB}{GFB}$$

with:
TFB: temperature variation demand allowing to make temperature T2 tend towards set point temperature Tc. TFB is a function of temperature T2 and of set point temperature Tc,
GFB: instantaneous gain to be applied at the current time to convert temperature variation demand TFB to hydrocarbon flow rate uFB. In particular, one can take GFB=Ginst.

Calculation of term TFB is based on a physical modelling of the oxidation catalyst. This calculation is carried out by a controller whose parameters are determined by means of a physical model of the oxidation catalyst, based on an energy balance of a gas phase and an energy balance of a solid phase. An example of a physical model of the oxidation catalyst is presented hereafter.

Such a model is based on the energy balance of a gas phase and the energy balance of a solid phase. These energy balances are obtained by balancing the energy exchanges in a control volume according to the following principle: the rate of variation of the energy stored in the control volume is equal to the difference between the rate of variation of the energy entering the control volume and the rate of variation of the energy leaving the control volume.

There are several formulations. They are listed in the following document:
C. Depcik, D. Assanis, One-dimensional automotive catalyst modeling, *Progress In Energy Combustion and Science.*, vol. 31, 2005, pp 308-369.

The principle is as follows:
The energy balance in the gas phase is written as follows:

$A+B=C$ where:
A is the term of energy storage in the gas phase. It is kept in our example but it can be very small and thus sometimes disregarded. It is commonly written as follows:

$$A = \rho g \ Cpg \ \varepsilon \frac{\partial T}{\partial t}$$

B is the term of energy transport in the gas phase linked with the displacement of the gas itself. It is commonly written as follows:

$$B = \rho g \ Cpg \ v \frac{\partial T}{\partial z}$$

C is a term of energy exchange between the gas phase and the solid phase. It is commonly written as follows:

$C = hg \ Ga(Tm-T)$

The energy balance in the solid phase is written:

$Am = Cm + Dm + Em + Fm$

Am is the term of energy storage in the solid phase. It is commonly written as follows:

$$Am = (1-\varepsilon)\rho m \ Cpm \frac{\partial Tm}{\partial t}$$

Cm is a term of energy exchange between the gas phase and the solid phase. It is commonly written as the opposite of term C $Cm = hg \ Ga(T-Tm)$ Dm is a term of energy exchange through conduction in the solid phase. It is disregarded in our example but it can be taken into account if necessary. It is commonly written as follows:

$$Dm = (1-\varepsilon)km \frac{\partial^2 Tm}{\partial z^2}$$

Em is a term representing the enthalpy produced or absorbed by the exothermic or endothermic aspect of the reactions occurring in the oxidation catalyst. It is commonly written as follows:

$$Em = Gca \sum_{j=1}^{NM} Rj \ hj$$

Fm is a term of thermal exchange with the outside medium. It commonly represents the "thermal losses". It is disregarded in our example but it could be included if necessary. It is written as follows:

$$Fm = h\infty As\infty (Tm - T\infty)$$

with:
T: local temperature of the gas. In the aforementioned document by Depcik, notation Tg is adopted instead of notation T,
Tm: local temperature of the solid,
ρg: gas density,
ρm: solid density,
Cpg: gas calorific value,
Cpm: solid calorific value,
ε: void fraction of the catalyst cake,
v: velocity representative of the velocity of the gas in the channels of the catalyst cake. In the aforementioned document by Depcik, notation u is adopted instead of notation v,
z variable of the axial dimension of the catalyst cake, In the aforementioned document by Depcik, notation x is adopted instead of notation z,
hg: coefficient of convective enthalpy exchange between the gas and the solid,
Ga: coefficient representative of the surface of exchange between the gas and the solid,
km: conductive exchange coefficient of the solid,
Gca: coefficient representative of the surface of exchange between the gas and the catalytic surface,
NM: number of chemical species taken into consideration in the catalytic reactions,
Rj: reaction rate of species j,
hj: reaction enthalpy of species j,
h∞: coefficient of convective enthalpy exchange between the solid and the ambient medium,
As∞: outer surface of the solid in contact with the ambient medium,
T∞: temperature representative of the temperature of the ambient medium.

According to an embodiment example, one uses a model based on the previous balance equations, simplified by taking into account only terms A, B, C, Am and Cm, then normalized as follows:

$$(sys): \begin{array}{l} \dfrac{\partial T}{\partial t} + v \dfrac{\partial T}{\partial z} = -k1(T - Tm) \\ \dfrac{\partial Tm}{\partial t} = k2(T - Tm) \end{array}$$

with:

$$k1 = \dfrac{hg \; Ga}{\varepsilon \; \rho g \; Cpg}$$

$$k2 = \dfrac{hg \; Ga}{(1-\varepsilon) \; \rho m \; Cpm}$$

Thus, the parameters of this simplified physical model are:
k1, k2 two constants characteristic of the oxidation catalyst
the geometrical parameters of the catalyst allowing to calculate velocity v from flow rate Q
length L
efficiency r (that can be a function of v)
adaptation variable Lu.
The inputs of this simplified physical model are:
gas mass flow rate Q
temperature T1 upstream from the oxidation catalyst
control hydrocarbon flow rate u (efficiency-adjusted flow rate of hydrocarbons present upstream from the oxidation catalyst).
Term Em that describes the enthalpy generation through oxidation of the chemical species such as hydrocarbons is not taken directly into account in the simplified physical model. It can be noted that the hydrocarbons are taken into account through the simplified model, but using a length Lu. This length Lu is obtained by means of the method described in the appendix similarly to the taking into account of term Em.

In the method according to the invention, parameters k1 and k2 are calculated or identified using the experimental indicial response to a variation of T1. This response is given analytically by formula (EQREP) given in Appendix 1, which corresponds to the solution of the system of equations (sys) for a step input of T1 and for a catalyst of length L. This response is diagrammatically shown in FIG. 7 as T1_SR.

Parameter Lu is an adjustment parameter allowing the indicial response to HC to be identified with an indicial response to T1 over a fictitious length Lu. Lu can notably be a function of v.

Parameter Lu is used to calculate uFB in the adaptation of the controller parameters.

A specific feature of the invention consists in proposing a method of adapting automatically the parameters of these controllers according to the engine operating conditions. Several conventional control structures are considered for calculation of TFB:
proportional integral type (PI) controller
simple integral type controller
internal model type controller
Smith predictor type controller.
These methods are described in detail in Appendix 2.

Figure 4:
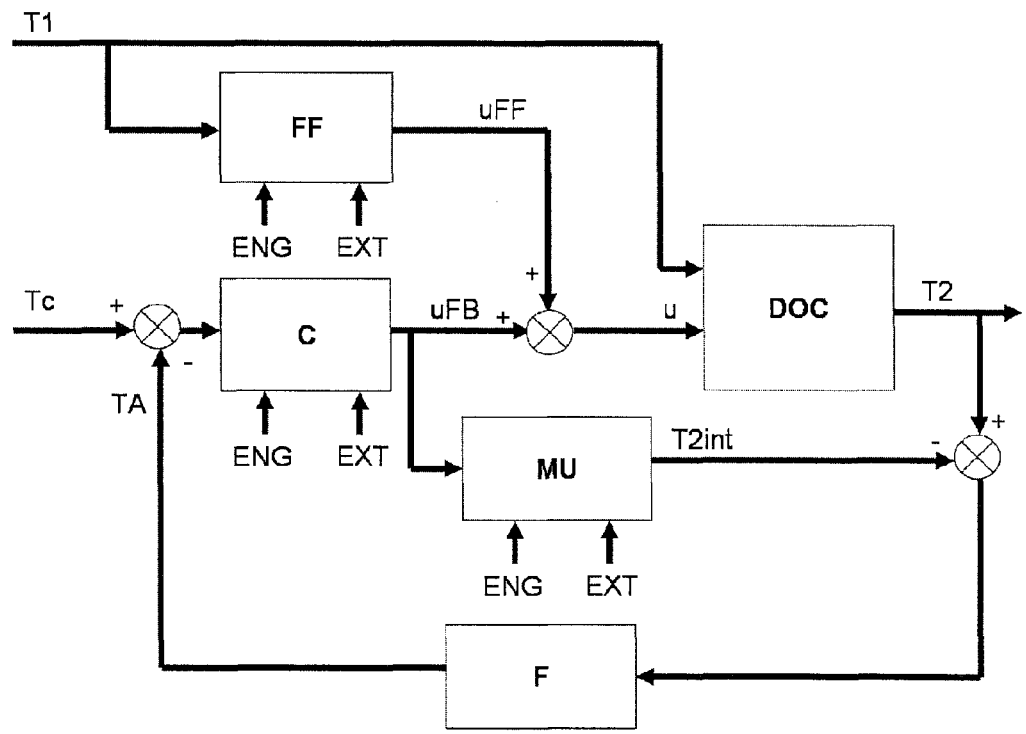

FIG. 4 diagrammatically illustrates a controller with an internal model MU used alternatively in the method according to the invention.

Figure 5:
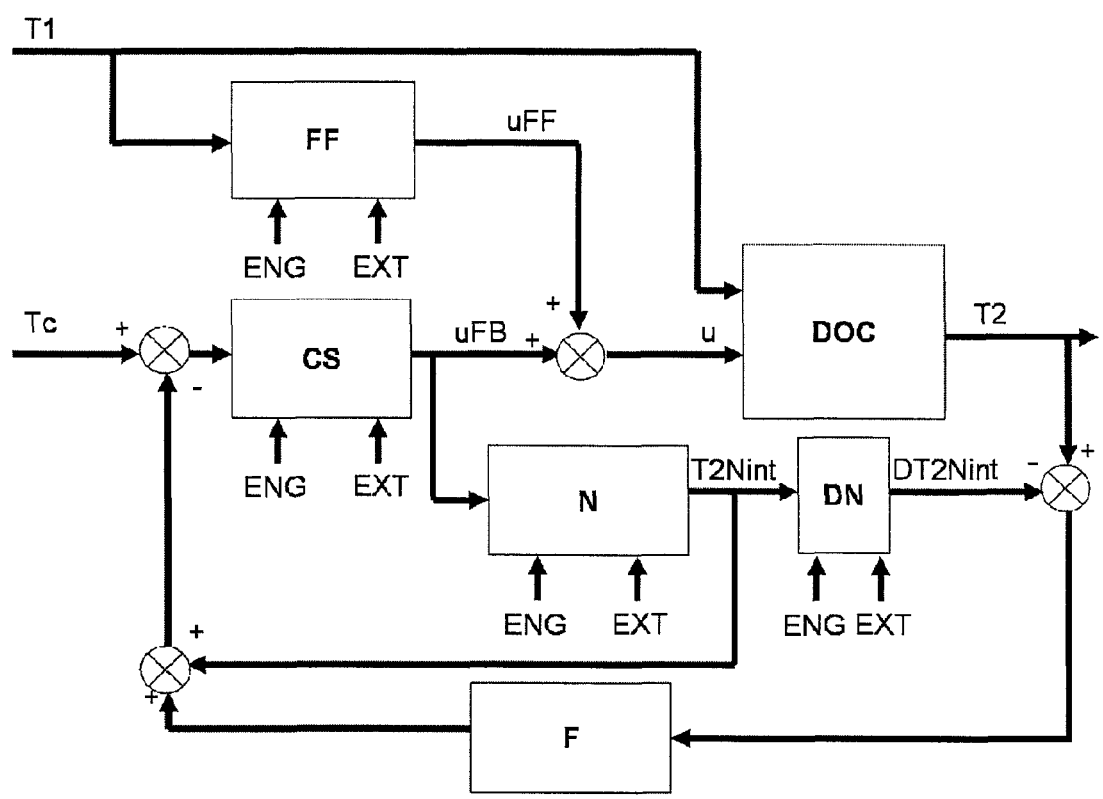

FIG. 5 diagrammatically illustrates a Smith predictor type controller representing a particular case of the controller shown in FIG. 4.

Figure 6:
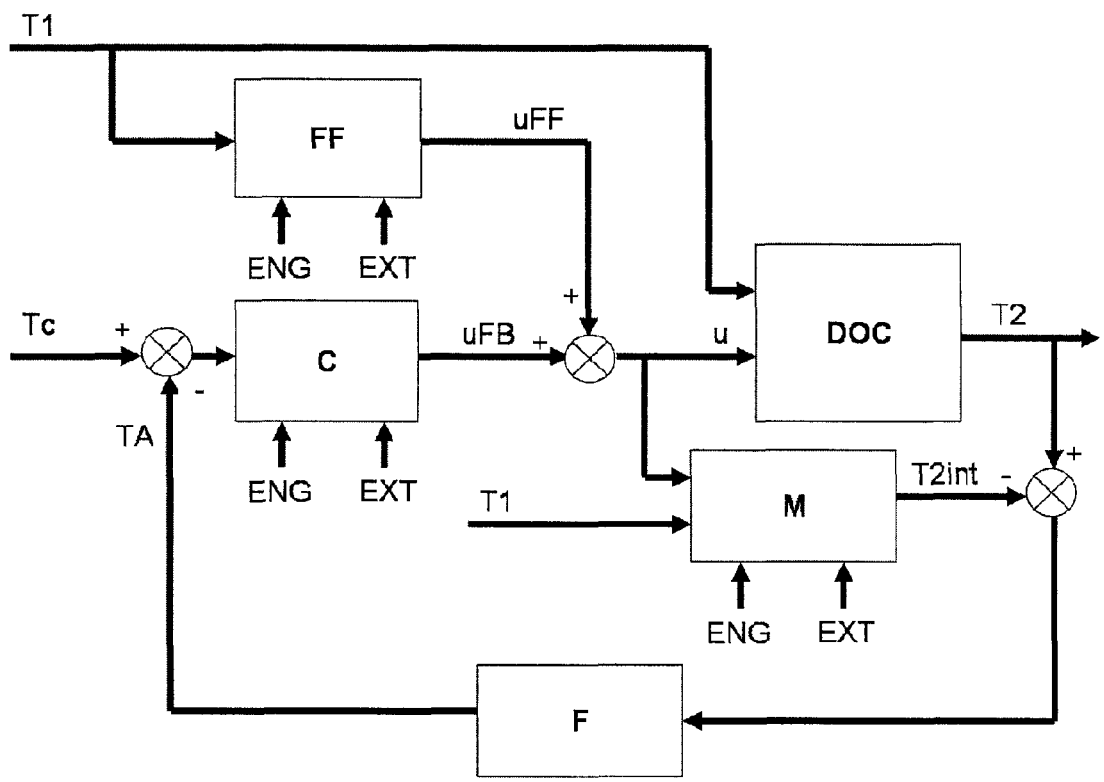

FIG. 6 diagrammatically illustrates a controller with an internal model M used alternatively in the method according to the invention, We take for example the commonest controller: the PI controller. This controller has 2 parameters.

In a conventional approach, these parameters are selected as follows. The engine is placed under a given operating condition. The 2 parameters are adjusted (optimized) "manually" (or automatically) while trying several adjustment combinations. One adjustment combination is chosen. The engine is placed under another operating condition. A new adjustment combination is chosen, and so on for each operating condition of the engine. This approach raises many problems. First, it requires much time for this calibration. Then, the coherence of the results between the various adjustments is not necessarily guaranteed. Finally, this approach gives the adjustment values only when the engine is on a stationary point: which value should be adopted when the engine goes from one operating condition to another?

According to the invention, these problems are overcome by expressing the value of the parameters of the controller by means of a very limited number of parameters of the physical model. From these parameters, values τc and δc corresponding to the time constant and to the pure delay of a delayed first-order system are automatically calculated by means of formulas (given in Appendix 2). Besides, knowing the gain, parameters Kp and of the PI controller are deduced therefrom using formulas known to the person skilled in the art, as a function of the operating conditions.

The invention also relates to an internal-combustion engine comprising an exhaust gas treatment system. Engine (10), in particular a diesel engine, discharges exhaust gas into an exhaust line (20). The system comprises an oxidation catalyst (15) and a particulate filter (16) arranged in the exhaust line. The oxidation catalyst is placed upstream from the particulate filter. Elements such as a turbine (30) or an exhaust gas recirculation intake (40) can be present between the engine and the oxidation catalyst. The system involves an injection system (80) acting in the engine and controlled by a control system (50). Alternatively, the control system can act upon a secondary injection system (85) injecting directly into the exhaust line between the engine and the oxidation catalyst. The control system according to the invention is suited for implementation of the methods according to the invention, in that it acts upon the injection system to provide a desired hydrocarbon flow rate upstream from the oxidation catalyst, according to the control laws of the invention.

The system preferably includes a temperature detector (17) upstream from the oxidation catalyst that provides a temperature value T1 representative of the temperature of the gas upstream from the oxidation catalyst. Alternatively, quantity T1 can be constructed using the information supplied by other detectors available in the engine and in the exhaust line.

The system preferably includes a temperature detector (18) downstream from the oxidation catalyst that provides a temperature value T2 representative of the temperature of the gas upstream from the particulate filter. Alternatively, quantity T2 can be constructed using the information supplied by other available detectors. This quantity T2 is the quantity the control system aims to bring close to a desired temperature Tc by means of the method according to the present invention.

The control system can take into account the ambient conditions (90) and the operating conditions (11) of the engine.

Appendix 1: Gains, values k1, k2, Lu and r

Introduction of Gains G, Ginst and Kd

Stationary gain G is defined as the ratio between the stationary value of a variation of T2 and the stationary value of the corresponding variation of hydrocarbon mass flow rate u that has induced this variation of T2, all the other parameters (notably T1 and Q) remaining constant.

$$G = \frac{\Delta T2}{r\, \Delta QHC1}$$

Δ expresses a variation in relation to any reference value.

Stationary gain G can be calculated by taking into account notably the reaction enthalpy of the hydrocarbons oxidized in the oxidation catalyst, the flow rate of the gas flowing into the oxidation catalyst, temperature T1, the calorific value of this gas, efficiency τ, the ambient conditions EXT and the operating conditions of the engine ENG. In particular, stationary gain G can be estimated by means of the following formula:

$$G = \frac{\Delta h}{Q\, Cpg},$$

where Δh is the enthalpy of the oxidation reaction of the oxidized hydrocarbons per unit mass of oxidized hydrocarbons and it is preferably expressed in kJ/kg.

The value of instantaneous gain Ginst is the value of the gain to be applied at the current time. This value can be taken equal to the value of stationary gain G. Alternatively, it can be taken equal to the value of stationary gain G corrected by a function of the filtered derivative of the gas flow passing through the catalyst. In particular, Ginst is defined as follows:

$$Ginst = \frac{G}{1 - K_B \frac{1}{Q} f\left(\frac{d\,Qsat}{dt}\right)}$$

where Qsat=min(max(Q, lmnQ), lmxQ), lmnQ being any positive value preferably equal to 0 and lmxQ being any positive value strictly greater than lmnQ; $K_B$ being any value; $f$ being a filter with a low-pass function; $f$ preferably being a first-order type filter whose time constant is preferably 1/k2.

Introduction of Values k1 and k2

Values k1 and k2 are characteristic values of the oxidation catalyst. They can be identified by means of formula EQREP by measuring T2 during a step variation of T1.

$$EQREP: \quad T2(t) = H\!\left(t - \frac{L}{v}\right)\exp\!\left(-\frac{k1\,L}{v}\right) \times \\ \left(1 + \int_0^{t-L/v} \exp(-k2\,\tau)\sqrt{\frac{k1\,k2\,L}{v\,\tau}}\, I1\!\left(2\sqrt{\frac{k1\,k2\,L}{v}\tau}\right) d\tau\right)$$

$$H(t) = \begin{cases} 1 & \text{if } t \geq 0 \\ 0 & \text{if } t < 0 \end{cases}$$

where H is the step function defined by; t represents the time; I1 is the modified Bessel function of the first kind defined by $$I1(x) = \frac{x}{2}\sum_{k=0}^{\infty} \frac{\left(\frac{z^2}{4}\right)^k}{k!\,\Gamma(2+k)};$$

Γ is the gamma function.

Velocity v is the mean velocity of the gas in the channels of the oxidation catalyst and it is preferably calculated by means of formula $$v = \frac{Q}{\rho g S'}$$

where S represents the mean section of the catalyst crossed by the gas of mean density ρg.

Values k1 and k2 can be identified with any equivalent form of this formula.

Alternatively, they can be calculated by means of the following formulas:

$$k1 = \frac{hgGa}{\varepsilon \rho g Cpg}$$

$$k2 = \frac{hgGa}{(1-\varepsilon)\rho m Cpm}$$

Ga is the geometrical surface-to-volume ratio representative of the surface of exchange between the gas and the solid,
hg is the coefficient of convective enthalpy exchange between the gas and the solid,
ε is the void fraction of the catalyst cake,
ρg is the mean density of the gas,
ρm is the mean density of the solid,
Cpg is the mean calorific value of the gas,
Cps is the mean calorific value of the solid.

For the detailed definitions of the values, please refer to the following publication:

C. Depcik, D. Assanis, One-dimensional automotive catalyst modeling, *Progress In Energy Combustion and Science*, vol. 31, 2005, pp 308-369.

Introduction of Lu

On the basis of experimental results, it is possible to establish that the responses to variations of T1 and to hydrocarbon flow rate variations are different (FIG. 7).

By adapting the length of the oxidation catalyst in the expression of the normalized indicial response to a variation of T1, one obtains a response that is very similar to the normalized indicial response to a hydrocarbon flow rate variation (FIG. 8), all the other parameters remaining equal. Length Lu is defined as the length of the oxidation catalyst allowing to best bring together, on the one hand, the response to a variation of T1 on a catalyst of length Lu and, on the other hand, the indicial response to a hydrocarbon flow rate variation on an oxidation catalyst of length L.

It can be noted that the notion of different length between L and Lu is equivalent to the notion of different response time between the response to a variation of T1 and the response to a hydrocarbon flow rate variation.

The variations of T1 are considered as disturbances. The precompensation strategy consists in synchronizing the effects of the variations of T1 on T2 with the effects of the variations of hydrocarbon flow rate u on T2 in order to reject the effects of the variations of T1 (FIG. 9). The synchronization delay is calculated under all the operating conditions.

Introduction of Efficiency r

Conventionally, efficiency r is defined as the ratio between the flow of hydrocarbons consumed in the oxidation catalyst and the total hydrocarbon flow rate u upstream from the oxidation catalyst.

$$r = \frac{u - QHC2}{u};$$

value u is the flow rate of hydrocarbons present upstream from the oxidation catalyst; value QHC2 is the flow rate of hydrocarbons present downstream from the oxidation catalyst.

Figure 10:
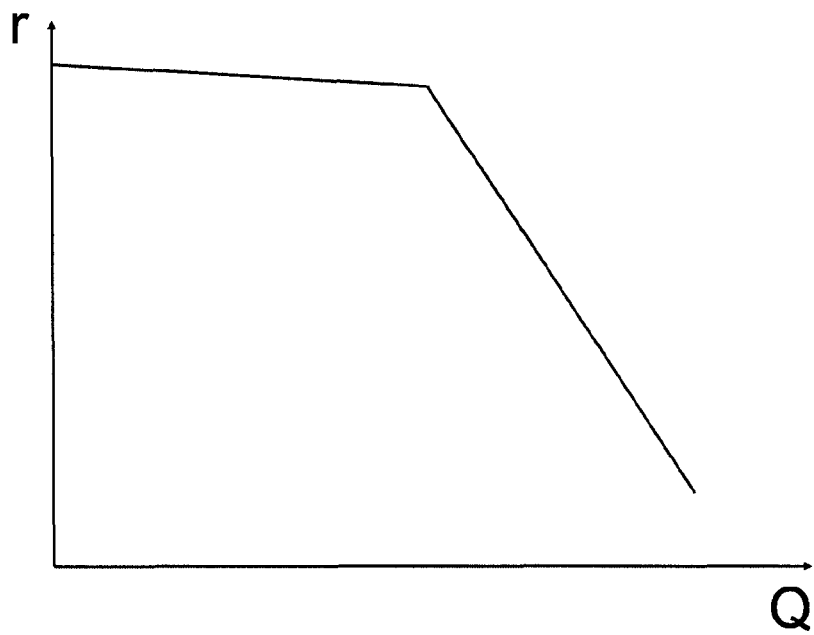
FIG. 10 shows the evolution of the hydrocarbon conversion efficiency as a function of the gas flow rate.

It is commonly observed that, in the temperature range required to carry out a regeneration, the efficiency essentially depends on the gas flow passing through the oxidation catalyst and it decreases with flow rate Q, as illustrated in FIG. 10.

Appendix 2: Calculation of TFB

1—Proportional Integral (PI) Type Controller

A first method consists in calculating TFB by means of a PI controller defined as follows:

Input: Tc−T2
Output: V
Transfer function:

$$Kp\left(1 + \frac{1}{\tau i s}\right)$$

S being the Laplace variable;
Kp and τi being the parameters of the PI controller.
TFB is then calculated as value V limited according to the equation:

TFB=max(min(V, lim_max), lim_min)

Values lim_max and lim_min are defined so as to take into account the physical constraints of the system.

An anti-windup algorithm is preferably additionally used.

In particular, parameters Kp and τi of the PI controller can be adapted with the gas flow rate on the basis of time constant τc, delay δc and gain Ginst of a delayed first-order system, by means of the Tavakoli-Fleming or Ziegler-Nichols automatic adjustments, or of any other automatic adjustment formulas of PI controllers based on a delayed first-order system. The person skilled in the art knows that all these adjustments express Kp and τi as a function of parameters τc, δc and Ginst.

In particular, value τC is preferably expressed by:

$$\tau c = \frac{aLu}{\exp(-2k1Lu/v)k2I1(2k1Lu/v)}$$

or alternatively by:

$$\tau c = \frac{2}{k2}aLu\sqrt{\pi}\sqrt{\frac{k1Lu}{v}}$$

or alternatively by:

$$\tau c = \frac{aLu}{\exp(-2k2\delta pist)k2I1(2k2\delta pist)}$$

or alternatively by:

$$\tau c = \frac{2}{k2}aLu\sqrt{\pi}\sqrt{k2\delta pist}.$$

In particular, value δc preferably expressed by:

$$\delta c = \frac{Lu}{v} + \frac{1}{k2}\frac{k1Lu}{v} - \tau c$$

or alternatively by:

δc=δpist−τc or alternatively by:

$$\delta c = \frac{Lu}{v} + \delta pist - \tau c.$$

In the previous equations of δc and τc, value δpist is obtained by solving the implicit equation as follows:

$$Lu = \int_{t-\delta pist(t)}^{t} v(w)dw$$

In the previous equations of δc and τc, value aLu can be any value and in particular a value close to 0.45. Alternatively, value αLu can be a value evaluated by means of the following formula:

$$aLu = 1 - \exp\left(-\frac{k1Lu}{v}\right) \times \left(1 + \int_0^{\frac{k1Lu}{k2v}} \exp(-k2\tau) \sqrt{\frac{k1k2Lu}{v\tau}} I1\left(2\sqrt{\frac{k1k2Lu}{v}}\tau\right) d\tau\right)$$

2—Simple Integral Type Controller

Alternatively, a second method can be used to calculate TFB. Term TFB is calculated by means of a simple integrator type controller defined as follows:
Input: Tc−T2
Output: V
Transfer function:

$$\frac{1}{\tau I s}$$

S being the Laplace variable; τI being the parameter of the controller.

TFB is calculated as value V limited according to the equation:

TFB=max(min(V, lim_max), lim_min)

Values lim_max and lim_min are defined so as to take into account the physical constraints of the system.

An anti-windup algorithm is preferably additionally used.

Value τI is expressed as a function of value δpist defined above, In particular, value τI can be calculated according to formula τI=2 δpist. Alternatively, τI can be calculated as a function of values τc and δc defined above. In particular, value δc can be calculated according to formula τI=δc+3 τc.

3—First-Order Internal Model Type Controller

Alternatively, and as a complement to the various configurations presented for calculation of uFF, calculation of TFB can be carried out conventionally with an internal model, preferably according to the configuration presented in FIG. 4, and by calculating the output of the internal model T2int as follows:

τc(t) ẋc(t)=−xc(t)+Ginst(t) uFB(t)

T2int(t)=xc(t−δc(t))

with values τc, δc and Ginst defined above. ẋ is defined as the derivative of variable x with respect to time t.

Term TFB is calculated by means of the output of a dynamic system CT whose output is V and whose input is the difference between set point temperature Tc and TA; TA is the filtered difference between temperature T2 and output T2int of an internal model of input uFB. Term TFB corresponds to the limited output of CT according to the equation:

TFB=max(min(V, lim_max), lim_min)

values lim_max and lim_min being defined so as to take into account the physical constraints of the system.

Dynamic system CT is conventionally selected in the synthesis of a delayed first-order type internal model controller. In particular, it provides rejection of constant additional disturbances and monitoring of set point Tc. Dynamic system CT is a function of operating conditions ENG or of ambient conditions EXT. In particular, CT can be selected as a scalar of value 1.

Block C of FIG. 4 consists of block CT defined above in series with the inverse of gain Ginst.

4—Smith Predictor Type Controller

In an equivalent manner to the control by internal model with a delayed first-order type internal model as described above, calculation of TFB can be carried out conventionally with a Smith predictor type controller, preferably according to the configuration shown in FIG. 5, and by calculating the output of a delayed first-order model using τc, δc and Ginst as the parameters. The output of the non-delayed first-order model (block N) is given by T2N int=xc with τc(t) ẋc(t)=−xc (t)+Ginst(t) uFB(t). The output of the delayed first-order model DT2N int corresponds to value T2N int delayed by delay operator DN by a delay of value δc(t). It is given by DT2Nint(t)=T2Nint(t−δc(t)). A robustness filter F is preferably used in the structure of the Smith predictor. In particular, this filter can be a filter of first order type.

Term TFB is preferably calculated by means of a PI controller of input Tc−T2N int−F(T2−DT2NINT) and of output V; the transfer function of the PI controller being $$Kp\left(1 + \frac{1}{\tau i s}\right);$$

S being the Laplace variable; Kp and τi being the parameters of the PI controller; parameter Kp is preferably 1 and parameter τi is preferably τc defined above.

TFB is calculated as value V limited according to the equation:

TFB=max(min(V, lim_max), lim_min)

Values lim_max and lim_min are defined so as to take into account the physical constraints of the system.

An anti-windup algorithm is preferably additionally used.

Block CS of FIG. 5 corresponds to term TFB calculated as described above and converted to hydrocarbon flow rate uFB by means of gain Ginst.

5—Erf u type internal model type controller

As a complement to the various configurations presented for calculation of uFF, calculation of TFB can be carried out conventionally with an internal model, preferably according to the configuration presented in FIG. 4, and by calculating the output of the internal model T2int at the time t by means of the output value T2int at the time $t_N$; $t_i$ being the i-th sample of the value of the current time t since an initial time $t_0$; i being a positive natural integer; the order of the samples respects the passage of time t in such a way that, for N>i>0, one has $t_N > t_i > t_{i-1} > t_0$; $t_N$ being the most recent sample of t. Output value $T2int(t_N)$ at the time $t_N$ is calculated for $N \geq 1$ according to:

$$T2int(t_N) = Ginst(t_0)uFB(t_0) + \sum_{n=1}^{N} A_n T_n(t_N)$$

$$A_n = Ginst(t_{N-n+1})uFB(t_{N-n+1}) - Ginst(t_{N-n})uFB(t_{N-n})$$

$$T_n(t_N) = \frac{1}{2}\left(1 - \mathrm{erf}\left(\frac{\zeta_n}{2\sqrt{\tau_n}}\right)\right)H(t_N - t_n)$$

$$\zeta_n = Lu - \int_{t_{N-n}}^{t_N} \frac{k2}{k1} v(s) ds$$

$$\tau_n = \int_{t_{N-n}}^{t_N} \frac{k2}{k1^2} v^2(s) ds$$

where erf is the error function defined by $$\text{erf}(x) = \frac{2}{\sqrt{\pi}} \int_0^x e^{-\omega^2} d\omega.$$

In particular, T2int(t)=T2int($t_N$) is preferably used with t≧$t_N$.

The output of the internal model T2int can also be calculated by any approximation of the above formulas. In particular, one can use the approximation consisting in truncating the sum to a limited number D of terms by means of the formula:

$$T2\text{int}(t) = G\text{inst}(t_{N-D})uFB(t_{N-D}) + \sum_{n=1}^{D} A_n T_n(t_N)$$

6—u+T1 First-Order Internal Model Type Controller

Alternatively, and as a complement to the various configurations presented for calculation of uFF, calculation of TFB can be carried out conventionally with an internal model of two-input and one-output type, preferably according to the configuration presented in FIG. 6, and by calculating the output of the internal model T2int as follows:

$$T2\text{int}(t) = xd(t - \delta d(t)) + xe(t - \delta c(t)),$$

where values τc and δc are described above, value xe is described by τc(t) ẋe(t)=−xe(t)+Ginst(t) u(t) and value xd is described by τd(t) ẋd(t)=−xd(t)+Kd(t) (T1(t)−Tbar) with values δd, τd, Kd and δpist defined as follows:

Value τd is preferably given by:

$$\tau d = \frac{aL}{\exp(-2\ k1\ L/v)k2\ I1(2\ k1\ L/v)}$$

or alternatively by:

$$\tau d = \frac{2}{k2} aL\sqrt{\pi} \sqrt{\frac{k1\ L}{v}}$$

or alternatively by:

$$\tau d = \frac{aL}{\exp(-2\ k2\ \delta pistL)k2\ I1(2\ k2\ \delta pistL)}$$

or alternatively by:

$$\tau d = \frac{2}{k2} aL\sqrt{\pi} \sqrt{k2\ \delta pistL}.$$

Value δd is preferably given by:

$$\delta d = \frac{L}{v} + \frac{1}{k2}\frac{k1\ L}{v} - \tau d$$

or alternatively by:

$$\delta d = \delta pistL - \tau d$$

or alternatively by:

$$\delta d = \frac{L}{v} + \delta pistL - \tau d$$

Value δpistL is preferably given by solving the following implicit equation:

$$L = \int_{t-\delta pistL(t)}^{t} v(w) dw$$

Value aL can be any value and in particular a value close to 0.45. Alternatively, value aL can be a value evaluated by means of the following formula:

$$aL = 1 - \exp\left(-\frac{k1\ L}{v}\right) \times$$
$$\left(1 + \int_0^{\frac{k1L}{k2v}} \exp(-k2\ \tau)\sqrt{\frac{k1\ k2\ L}{v\tau}}\ I1\left(2\sqrt{\frac{k1\ k2\ L}{v}\tau}\right) d\tau\right)$$

Term TFB is calculated by means of the output of a dynamic system CT defined above. In particular, CT can be selected as a scalar of value 1.

Block C of FIG. 6 consists of block CT described above in series with the inverse of gain Ginst.

7—Erf u+Erf T Type Internal Model Type Controller

Alternatively, and as a complement to the various configurations presented for calculation of uFF, calculation of TFB can be carried out conventionally with an internal model of two-input and one-output type, preferably according to the configuration presented in FIG. 6, and by calculating the output of the internal model T2int by means of outputs xq and xp of two intermediate models; in these models, $t_i$ being the i-th sample of the value of the current time t since an initial time $t_0$; i being a positive natural integer; the order of the samples respect the passage of time t in such a way that, for N>i>0, one has $t_N > t_i > t_{i-1} > t_0$; $t_N$ being the most recent sample of t. The value of output xq at the time $t_N$ is calculated for N≧1 according to:

$$xq(t_N) = G\text{inst}(t_0)u(t_0) + \sum_{n=1}^{N} Aq_n T_n$$

$$Aq_n = G\text{inst}(t_{N-n+1})u(t_{N-n+1}) - G\text{inst}(t_{N-n})u(t_{N-n})$$

$$T_n = \frac{1}{2}\left(1 - \text{erf}\left(\frac{\zeta_n}{2\sqrt{\tau_n}}\right)\right) H(t_N - t_n)$$

$$\zeta_n = Lu - \int_{t_{N-n}}^{t_N} \frac{k2}{k1} v(s) ds$$

$$\tau_n = \int_{t_{N-n}}^{t_N} \frac{k2}{k1^2} v^2(s) ds$$

and the value of output xp at the time $t_N$ is calculated for N≧1 according to:

$$xp(t_N) = Kd(t_0)(T1(t_0) - Tbar) + \sum_{n=1}^{n} Ap_n T_n$$

$$Ap_n = Kd(t_{N-n+1})(T1(t_{N-n+1}) - Tbar) - Kd(t_{N-n})T1(t_{N-n}) - Tbar)$$

-continued $$T_n = \frac{1}{2}\left(1 - \text{erf}\left(\frac{\zeta L_n}{2\sqrt{\tau_n}}\right)\right)H(t_N - t_n)$$

$$\zeta L_n = L - \int_{t_{N-n}}^{t_N} \frac{k2}{k1} v(s)ds$$

$$\tau_n = \int_{t_{N-n}}^{t_N} \frac{k2}{k1^2} v^2(s)ds$$

where erf is the error function defined by $$\text{erf}(x) = \frac{2}{\sqrt{\pi}} \int_0^x e^{-\omega^2} d\omega.$$

In particular, T2 int(t)=xq($t_N$)+xp($t_N$) is preferably used with t≧$t_N$.

The output of the internal model T2int can also be calculated by any approximation of the formulas above. In particular, it is possible to use the approximation that consists in truncating the sum to a limited number D of terms by means of the formulas:

$$xq(t_N) = Ginst(t_{N-D})u(t_{N-D}) + \sum_{n=1}^{D} Aq_n T_n(t_N)$$

$$xp(t_N) = Kd(t_{N-D})(T1(t_{N-D}) - Tbar) + \sum_{n=1}^{D} Ap_n T_n(t_N)$$

Term TFB is calculated by means of the output of a dynamic system CT defined above. In particular, CT can be selected as a scalar of value 1.

Block C of FIG. 6 consists of block CT defined above in series with the inverse of gain Ginst.

The invention claimed is:

1. A method of treating the exhaust gas of an internal-combustion engine equipped with a particulate filter and an oxidation catalyst arranged upstream from said filter, wherein active regeneration of said filter is controlled by means of a dynamic control of a temperature T2 of said gas leaving said oxidation catalyst, the method comprising the following steps:
   i-determining a set point temperature Tc of said gas leaving said catalyst so as to provide active regeneration of said filter,
   ii-determining a temperature demand necessary for control of said temperature T2,
   iii-determining a stationary gain G defined as the ratio between the stationary value of a variation of T2 and a stationary value of a hydrocarbon mass flow rate variation that has induced said variation of T2,
   iv-correcting said gain G so as to take into account a gas flow rate variation at the inlet of said catalyst, the gain being transiently increased in relation to G for a gas flow rate increase and transiently decreased in relation to G for a gas flow rate decrease,
   v-defining a control law for a hydrocarbon flow rate at the inlet of said oxidation catalyst, through the ratio of said temperature demand and said corrected gain,
   vi-modifying the hydrocarbon flow rate by applying the control law so that the temperature of said gas leaving said catalyst meets said set point temperature.

2. A method as claimed in claim 1, wherein said gain G is corrected by calculating a derivative of the gas flow passing through said catalyst.

3. A method as claimed in claim 1, wherein said gain G is corrected by applying a delay to the gain according to the following formula:

Ginst(t)=G(t−D(t))

with Ginst the corrected gain, D the delay determined as a function of gas flow rate Q and of its variations, t the time.

4. A method of treating the exhaust gas of an internal-combustion engine equipped with a particulate filter and an oxidation catalyst arranged upstream from said filter, wherein active regeneration of said filter is controlled by means of a dynamic control of a temperature T2 of said gas leaving said oxidation catalyst, the method comprising the following steps:
   i-determining a temperature demand TFF necessary to compensate for an effect of a variation of temperature T1 of said gas at the inlet of said catalyst, TFF being a function of a difference between T1(t−δ(t)) and a reference value Tbar, where T1(t−δ(t)) is an expression of a measurement of T1(t) delayed by a delay of value δ(t);
   ii-determining a stationary gain G defined as the ratio between the stationary value of a variation of T2 and a stationary value of a hydrocarbon mass flow rate variation that has induced said variation of T2, all the other parameters remaining constant;
   iii-defining a control law uFF of a hydrocarbon flow rate at the inlet of said oxidation catalyst, through the ratio between said temperature demand TFF and said gain,
   iv-modifying the hydrocarbon flow rate by applying the control law so that the temperature of said gas leaving said catalyst meets said temperature demand TFF.

5. A method as claimed in claim 4, wherein delay δ is defined as a function of a delay δ2 obtained by solving the implicit equation as follows:

$$L - Lu = \int_{t-\delta 2(t)}^{t} v(w)dw$$

with:
   L: a length of the oxidation catalyst,
   Lu: an oxidation catalyst length allowing to best bring together, on the one hand, a normalized indicial response to a variation of T1 on a catalyst of length Lu and, on the other hand, a normalized indicial response to a hydrocarbon flow rate variation on an oxidation catalyst of length L,
   V: a mean velocity of the gas in said oxidation catalyst.

6. A method as claimed in claim 4, wherein said gain G is corrected so as to take into account a gas flow rate variation at the inlet of said catalyst, the gain being transiently increased in relation to G for a gas flow rate increase and transiently decreased in relation to G for a gas flow rate decrease.

7. A method of treating the exhaust gas of an internal-combustion engine equipped with a particulate filter and an oxidation catalyst arranged upstream from said filter, wherein active regeneration of said filter is controlled by means of a dynamic control of a temperature T2 of said gas leaving said oxidation catalyst, the method comprising the following steps:
   i-determining a set point temperature Tc of said gas leaving said catalyst so as to provide active regeneration of said filter,
   ii-determining a temperature demand TFB necessary for temperature T2 of said gas leaving said catalyst to meet said set point temperature Tc, said demand TFB being calculated from a controller whose parameters are determined by means of a physical model of the oxidation catalyst, based on an energy balance of a gas phase and an energy balance of a solid phase, as a function of the engine operating conditions, iii-determining a stationary gain G defined as the ratio between the stationary value of a variation of T2 and a stationary value of a hydrocarbon mass flow rate variation that has induced said variation of T2, iv-defining a control law uFB for a hydrocarbon flow rate at the inlet of said oxidation catalyst, through the ratio of said temperature demand TFF and said gain, v-modifying the hydrocarbon flow rate by applying the control law so that the temperature of said gas leaving said catalyst meets said set point temperature.

8. A method as claimed in claim 7, wherein said gain G is corrected so as to take into account a gas flow rate variation at the inlet of said catalyst, the gain being transiently increased in relation to G for a gas flow rate increase and transiently decreased in relation to G for a gas flow rate decrease.

9. A method as claimed in claim 7, wherein said control law applied to modify the hydrocarbon flow rate is defined by the sum of said control laws uFF and uFB.

10. A method as claimed in claim 9, wherein said gain G is corrected so as to take into account a gas flow rate variation at the inlet of said catalyst, the gain being transiently increased in relation to G for a gas flow rate increase and transiently decreased in relation to G for a gas flow rate decrease.

11. An internal-combustion engine comprising an exhaust gas treatment system, an oxidation catalyst arranged upstream from a particulate filter and an injection system acting in the engine, and a control system configured to control said injection system so as to provide a hydrocarbon flow rate upstream from the oxidation catalyst, in accordance with the method as claimed in claim 1.

12. An internal-combustion engine comprising an exhaust gas treatment system, an oxidation catalyst arranged upstream from a particulate filter and an injection system acting in the engine, and a control system configured to control said injection system so as to provide a hydrocarbon flow rate upstream from the oxidation catalyst, in accordance with the method as claimed in claim 4.

13. An internal-combustion engine comprising an exhaust gas treatment system, an oxidation catalyst arranged upstream from a particulate filter and an injection system acting in the engine, and a control system configured to control said injection system so as to provide a hydrocarbon flow rate upstream from the oxidation catalyst, in accordance with the method as claimed in claim 7.

14. A method as claimed in claim 4, wherein said control law applied to modify the hydrocarbon flow rate is defined by the sum of said control laws uFF and uFB.

15. A method as claimed in claim 14, wherein said gain G is corrected so as to take into account a gas flow rate variation at the inlet of said catalyst, the gain being transiently increased in relation to G for a gas flow rate increase and transiently decreased in relation to G for a gas flow rate decrease.

* * * * *